May 25, 1948.                L. J. WHITE                2,442,156
VALVE UNIT FOR LIQUEFIED PETROLEUM GAS SYSTEMS
Filed June 15, 1944            3 Sheets-Sheet 1

INVENTOR.
L. J. White.
BY A. D. Adams
atty.

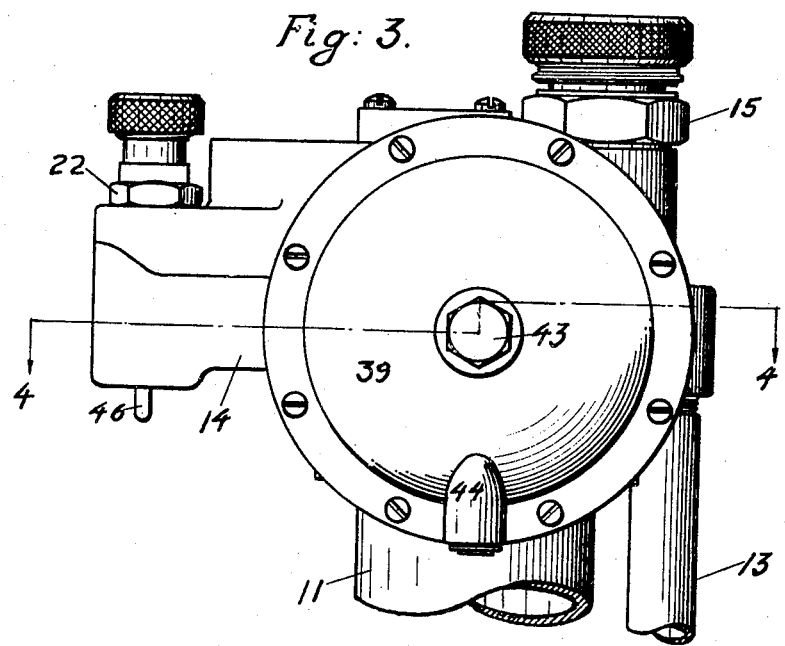
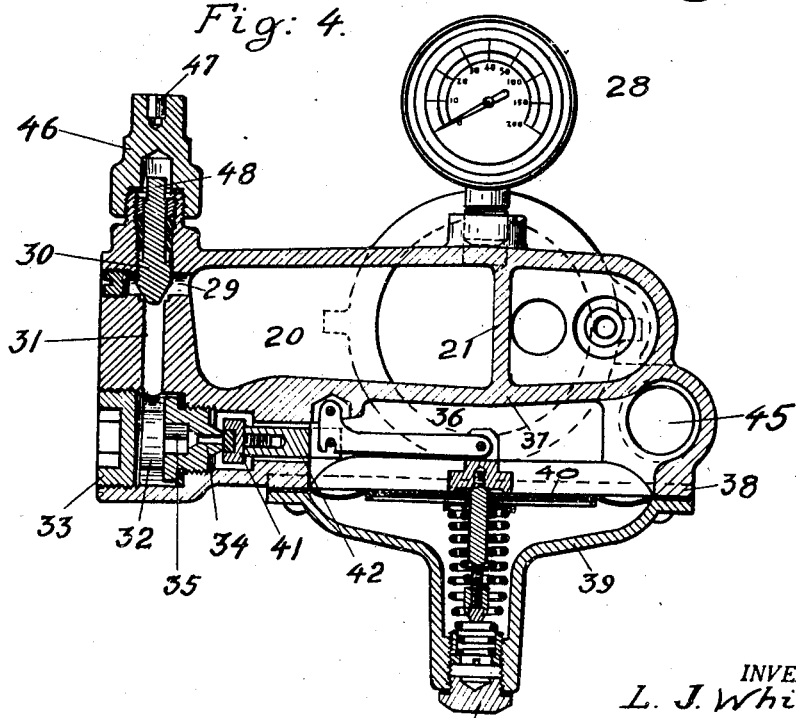

May 25, 1948.   L. J. WHITE   2,442,156
VALVE UNIT FOR LIQUEFIED PETROLEUM GAS SYSTEMS
Filed June 15, 1944   3 Sheets-Sheet 3
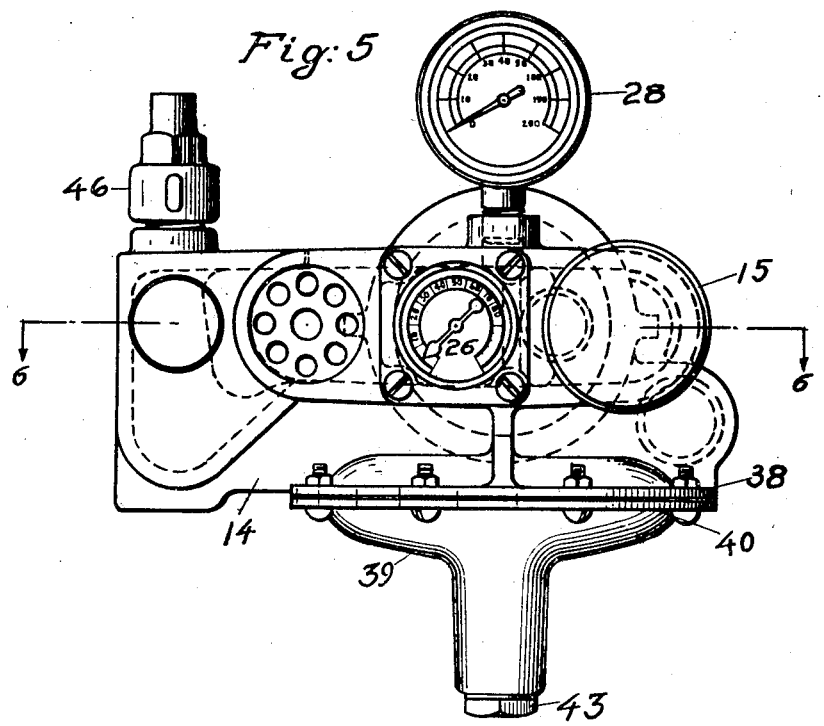
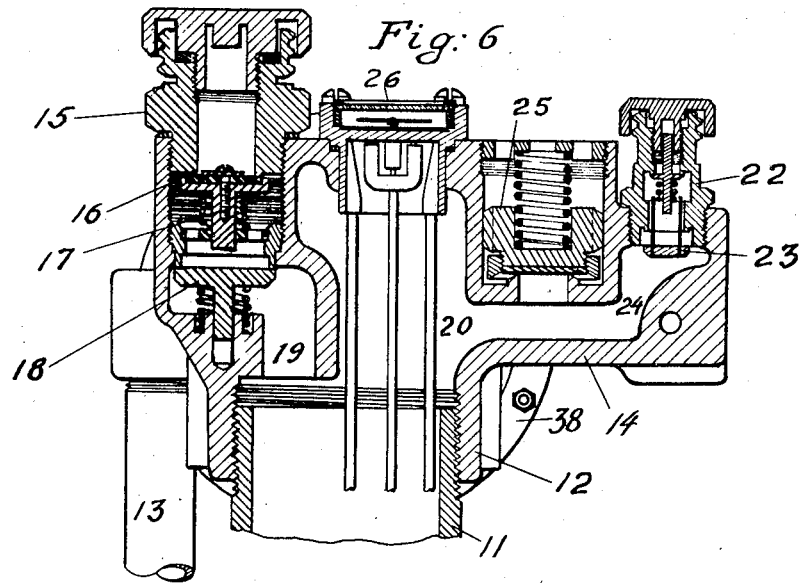
INVENTOR.
L. J. White.
BY A. D. Adams
atty.

Patented May 25, 1948

2,442,156

UNITED STATES PATENT OFFICE 2,442,156

VALVE UNIT FOR LIQUEFIED PETROLEUM GAS SYSTEMS

Loyd J. White, San Antonio, Tex., assignor to Southern Steel Company, San Antonio, Tex., a corporation of Texas Application June 15, 1944, Serial No. 540,406

2 Claims. (Cl. 62—1)

This invention relates to liquefied petroleum gas systems for dispensing commercial butane, propane, or other highly volatile liquefied petroleum gases and mixtures thereof.

One of the main objects of the invention is to provide a greatly improved composite unit in which a pressure reducing regulator is combined with the necessary control valves and other appurtenances, so that it may be factory-tested as a unit and, thereafter, connected to an ordinary pressure storage tank, as a part of a complete system.

Another object is to provide a composite unit of the type described, wherein the operative parts of the pressure reducing regulator are embodied within the unit. One of the ideas is to incorporate a readily removable valve nozzle with its disc and disc retainer at a point within the unit where they are readily accessible for removal for repair and replacement. A further idea is to so arrange the regulator valve that it can absorb heat from the metal body of the unit, as well as the high pressure gas supplied through it, so that it tends to prevent the valve from sticking, due to freezing of any contained moisture in the gas. In other words, the idea is to minimize the trouble caused by the point of expansion of the gas or the so-called "cold spot" in detached regulators.

Another object is to provide a composite unit of this type embodying a cut-off valve in a passageway leading to the low pressure chamber of the pressure reducing regulator and so connected and arranged that the gas can be cut off to permit repairs or replacements of the valve parts of the regulator.

Another object is to eliminate the usual pipe fittings required to connect an ordinary separate regulator to a service pipe leading from a valve unit. Also, the arrangement is so contrived that the regulator is readily accessible for adjustments, replacements, and repairs.

Another object is to provide a composite unit of this type which permits the use of a relatively small protecting casing at the upper end portion of a stand-pipe near the ground level, in an underground system, so that the stand-pipe may be buried in the ground between the storage tank and the casing by a substantial depth of earth fill to prevent unnecessary loss of stored heat from the storage tank and its contents. Also, the idea is to provide for effective heat insulation with less insulating material than is required in other types of protecting casing.

Other aims and advantages of the invention will appear in the specification, when considered in connection with the illustrative embodiment thereof shown in the accompanying drawings, wherein:

Figure 3 is another enlarged view taken at right angles to Figure 2;

Figure 4 is a horizontal sectional view taken on the line 4—4 of Figure 3, back flow check valve parts being omitted.

Figure 5 is a top plan view of the unit; and

Figure 6 is a vertical sectional view taken on the line 6—6 of Figure 5.

Figure 1:
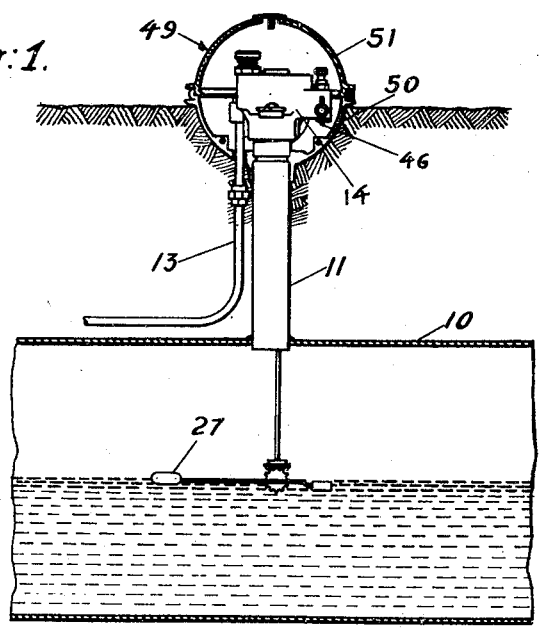
Figure 1 is a fragmentary sectional view, partly in elevation, showing the preferred form of unit applied to an underground system.

Referring more particularly to the drawings, the improved valve unit, there shown, is applied to an underground gas storage and generating system, wherein liquefied gas is stored under pressure in a pressure vessel or tank 10 which absorbs vaporizing heat from the surrounding earth. However, it is to be understood that the unit is applicable to above-ground systems. In the present instance, the storage tank 10 is shown as having a riser pipe or stand-pipe 11 extending to a point near the ground level and serving as a means for filtering the tank and dispensing gas from the system.

The improved composite unit is shown as being connected to the upper end of the stand-pipe by means of a screw threaded collar 12 and it embodies a pressure reducing regulator and other necessary valves and appurtenances, the arrangement being such that low-pressure gas for household use can be dispensed from it through a service pipe 13, shown as extending under-ground from the unit.

The composite unit is shown as comprising a single chambered casing 14 preferably, though not necessarily, made of bronze, or other suitable material having a relatively high heat conductivity. It may conveniently be made of a single cored casing provided with chambers so arranged that the liquefied gas may be charged into the tank while vapor is being dispensed to gas consuming appliances.

In the present example, the unit is shown in Figure 6, as including a filler fitting 15 having a valve seat 16 and a spring-urged filler valve 17 which is normally closed and adapted to be opened by the pressure of the liquefied gas when a filling hose is applied to the filler connection. There is associated with the filler valve a back-flow check valve 18 which is shown as being spring urged and which also remains normally closed. It is likewise adapted to be opened by the pressure of the incoming liquid when the tank is being filled. The arrangement is such that the filler valve 17 and associated parts can be removed, while the back-flow check valve prevents the escape of gas from the system.

The liquid delivered through the filler valve is guided through a conduit passageway 19 to flow into the top of the stand-pipe 11, at one side, as clearly shown in Figure 6. Gas generated and delivered from the tank passes into and through a main chamber 20 separated from the filling passage 19 by a web 21, as best shown in Figures 4 and 6. The arrangement is such that, when the tank is being filled, the liquid is prevented from splashing over and mixing with the outgoing vapor or gas.

To enable the tank to be filled by the gravity method, there is shown an ordinary vapor return valve 22 to which a vapor return hose is adapted to be connected, and this valve embodies an excess flow check valve 23. The arrangement is such that the excess flow check valve will close if the vapor return hose is ruptured. It will also be understood that the connection of the vapor return hose to the valve fitting 22 is such that it holds the vapor return valve open when the hose fitting is properly connected. The vapor return valve is preferably arranged on the end of the fitting opposite from the filling valve to provide ample space for connecting separate hoses without interfering with each other. In this example, a branch conduit or passageway 24 leads from the main chamber 20 to the vapor return valve, and a pressure relief valve 25 is also arranged to communicate with the main chamber. The relief valve is shown as being arranged within the confines of the unit, so that it will not be subject to external damage or unauthorized tampering. In the present example, an ordinary magnetic, level gauge 26 is shown as being installed in the unit within an opening immediately above the main chamber 20. It is operated by the usual type of float 27, which can be inserted within and removed through the stand-pipe and the unit. However, it is to be understood that any other suitable type of level gauge may be employed in connection with the improved unit. Also, on one side of the unit there is shown a boss having an opening through which a pressure gauge 28 may be connected, if desired.

The generated gas is dispensed through the chamber 20, passing through a drilled opening 29 at one end of the unit; thence through a cut-off valve 30 arranged in a drilled passageway or conduit 31 at right angles to the opening 29. From the drilled passageway 31, the gas is delivered to a counterbored chamber 32 closed by a plug 33 and carrying the valve nozzle 34 of the pressure-reducing regulator. The nozzle is screwed into the counterbore and has a wrench socket 35, so that it can easily be removed.

Figure 2:
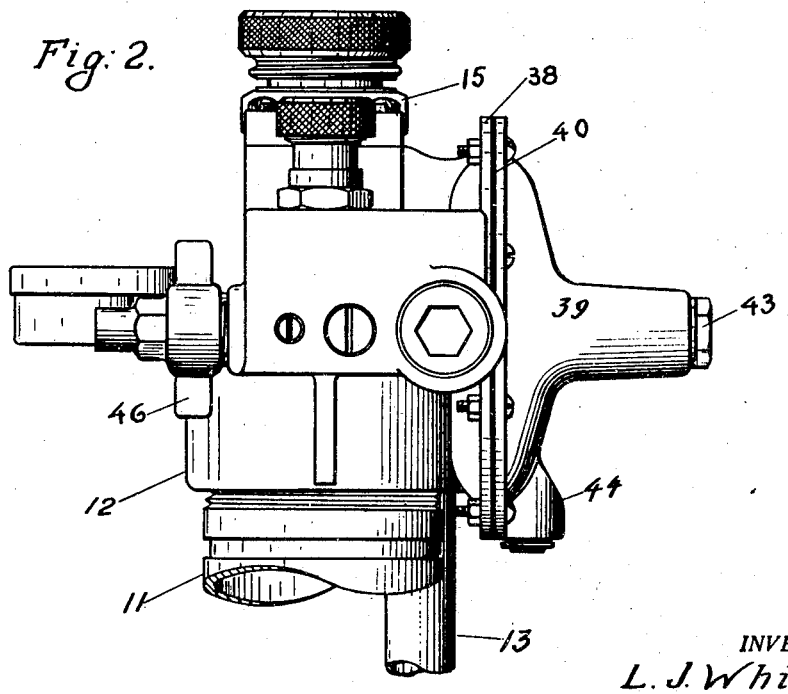
Figure 2 is an enlarged side elevation of the unit taken at right angles to Figure 1.

In this example, the pressure reducing regulator is physically embodied in the unit and includes a low-pressure chamber 36 formed by a web 37 of the unit and a flange 38 integral with the unit. The bonnet outer section 39 of the regulator is of the usual type and is removably secured to the flange 38 to hold the diaphragm 40 in place. The regulating valve 41 is preferably of the conventional type and cooperates with the nozzle 34. It is removable from the operating plunger 42 and can be taken out after the nozzle 34 is removed through the plugged opening of the chamber 32. The cut-off valve 30 has to be closed to stop the flow of gas, when these parts are removed. The valve is easily accessible from one end of the unit so that the valve disc can be repaired or replaced when necessary. Furthermore, the spring pressure on the diaphragm can be easily adjusted by removing the plug 43 at the end of the regulator bonnet or section 39. The regulator has a low-pressure relief outlet 44 arranged at the bottom portion of the bonnet section 39, as best shown in Figures 2 and 3, to permit water of condensation to drain out of the bonnet.

The gas passes through the low pressure chamber 36 of the regulator downwardly through an opening or outlet 45 at the bottom of the casing, into the service pipe 13, shown as being screw threaded in a boss or enlargement at the left end of the casing in Figure 6.

When it is desired, for any reason, to cut off the supply of gas, the cut-off valve 30 can be operated by removal of the key 46 which has a non-circular socket 47 to engage the outer end of the stem 48 of the valve.

It will be noted that the unit is of relatively small size and is shown as being arranged near the ground level. In an underground installation, it is adapted to be enclosed within a relatively small protecting case conveniently secured directly to the stand-pipe, near the upper end thereof. In this instance, a generally spherical metal casing 49 is shown as being composed of sections suitably clamped on the standpipe in an annular groove. As shown in Figure 1, the lower, substantially hemispherical section 50 is made in two parts adapted to be clamped around the stand-pipe. In this example, a vented upper section 51 of the casing is removably connected to the lower section to afford access to the unit. The arrangement is such that all of the adjustable or removable parts of the unit are readily accessible within the lower half or section of the casing. The small casing lends itself readily to the use of a minimum amount of insulating material to provide effective insulation for the unit, especially in extremely cold climates where the atmospheric temperature may be well below the boiling point of the liquefied gas. Moreover, the small casing at the top of a buried stand-pipe, permits adequate insulating earth fill to be used between the tank and the protecting casing to prevent the rapid escape of stored heat in the tank and its contents in cold climates. The usual type of protecting casing connected directly to a tank and extending upwardly to the ground level, permits rapid dissipation of stored heat from the tank and its contents, due to stack effect.

From the foregoing description, it will be noted that the unit is very compact and lends itself readily to automatic machine operations because of the arrangement of the openings and other parts to be machined. In other words, the machine work can be done with a minimum number of operations. Furthermore, by making the unit of metal having a relatively high heat conductivity, a sufficient quantity of heat is stored in the metal, as well as in the body of the gas, to minimize freezing of the contained moisture in the vapor which causes troublesome sticking of the regulator valve.

Obviously, the invention is not restricted to the particular embodiment thereof herein shown and described, but is capable of a wide variety of modification within the scope of the appended claims.

What is claimed is:

1. In a liquefied petroleum gas dispensing system embodying a pressure storage tank having a pipe through which the tank is adapted to be filled and fuel is discharged, a filling and dispensing unit connected to the pipe comprising a hollow body having an associated pressure reducing regulator forming a part thereof; said body having integral partitions defining a filling passage, a main chamber and a low pressure chamber; said chambers communicating with the tank through the pipe; the arrangement of the chambers being such that the low pressure chamber extends across the other chambers and is separated therefrom by said partitions; a passageway in the body connecting the main and low pressure chambers; a manually operated valve in the passageway; a regulator assembly including a diaphragm defining one wall of the low pressure chamber; and a valve actuated by the diaphragm controlling the passage of fuel into the low pressure chamber.

2. Apparatus, as set forth in claim 1, wherein the passageway connecting the main and low pressure chambers extends through the casing adjacent to one lateral extremity of said chambers.

LOYD J. WHITE.

REFERENCES CITED

The following references are of record in the file of this patent:

UNITED STATES PATENTS

| Number | Name | Date |
| --- | --- | --- |
| 632,808 | Dunlap | Sept. 12, 1899 |
| 2,011,764 | Hughes | Aug. 16, 1935 |
| 2,131,270 | Chittim | Sept. 27, 1938 |
| 2,225,570 | White | Dec. 17, 1940 |
| 2,293,356 | Parker | Aug. 18, 1942 |
| 2,309,405 | Matteson | Jan. 26, 1943 |
| 2,361,865 | Norway | Oct. 31, 1944 |